(12) United States Patent
Strack et al.

(10) Patent No.: US 9,296,955 B2
(45) Date of Patent: Mar. 29, 2016

(54) PROCESS AND APPARATUS FOR CO-PRODUCTION OF OLEFINS AND ELECTRIC POWER

(75) Inventors: Robert D. Strack, Houston, TX (US); Jennifer L. Bancroft, Houston, TX (US); Paul Michael Edwards, Romsey (GB); Gregory E. Yeo, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1054 days.

(21) Appl. No.: 13/219,397

(22) Filed: Aug. 26, 2011

(65) Prior Publication Data
US 2012/0067058 A1    Mar. 22, 2012

Related U.S. Application Data

(60) Provisional application No. 61/384,592, filed on Sep. 20, 2010.

(30) Foreign Application Priority Data

Oct. 27, 2010    (EP) ..................................... 10189089

(51) Int. Cl.
*C10G 7/00* (2006.01)
*C10G 9/00* (2006.01)
(Continued)

(52) U.S. Cl.
CPC .. *C10G 7/00* (2013.01); *C10G 7/06* (2013.01); *C10G 7/12* (2013.01); *C10G 9/00* (2013.01);
(Continued)

(58) Field of Classification Search
CPC .............. C10G 7/00; C10G 7/06; C10G 7/12; C10G 9/00; C10G 9/20; C10G 2300/1037; C10G 2300/1074; C10G 2400/20; F02C 3/00; F01K 3/20

USPC ........... 196/46, 100, 105, 114; 202/112, 154, 202/158, 209; 60/780, 39.12, 227
See application file for complete search history.

(56) References Cited

U.S. PATENT DOCUMENTS 3,702,292 A    11/1972    Burich
4,265,731 A    5/1981    Mitchell
(Continued)

FOREIGN PATENT DOCUMENTS

EP    259114    3/1988
EP    0955455    11/1999
(Continued)

OTHER PUBLICATIONS

Y. Yoshimura et al. "Catalytic cracking of naptha to light olefins" Catalysis Surveys from Japan vol. 4, No. 2 (2000) pp. 157-167. XP002619350.

*Primary Examiner* — Renee E Robinson
*Assistant Examiner* — Jonathan Miller (57) ABSTRACT

A method and system are disclosed for co-production of olefins and electric power. The method includes determining a separation level, separating a hydrocarbon feed into a light fraction stream and a heavy fraction stream based on the determined separation level; generating electric power from the heavy fraction stream; and cracking the light fraction stream in a pyrolysis unit to produce an effluent comprising olefins. The separation level may be based on olefin production requirements and electric power requirements or specific split of the hydrocarbon feed to be utilized for power generation and olefin production.

14 Claims, 4 Drawing Sheets

(51) Int. Cl.
*C10G 7/06* (2006.01)
*C10G 9/20* (2006.01)
*F02C 3/00* (2006.01)
*C10G 7/12* (2006.01)
*F01K 3/20* (2006.01)

(52) U.S. Cl.
CPC ... *C10G 9/20* (2013.01); *F01K 3/20* (2013.01); *F02C 3/00* (2013.01); *C10G 2300/1074* (2013.01); *C10G 2400/20* (2013.01)

(56) References Cited

U.S. PATENT DOCUMENTS

| | | | |
|---|---|---|---|
| 4,309,271 A * | 1/1982 | Dorner | 208/57 |
| 4,912,282 A * | 3/1990 | Klaus | 585/648 |
| 5,983,668 A | 11/1999 | Espie | |
| 6,923,004 B2 * | 8/2005 | Chandran et al. | 60/781 |
| 7,193,123 B2 * | 3/2007 | Stell et al. | 585/652 |
| 7,244,872 B2 * | 7/2007 | Woodfin | 585/651 |
| 7,540,951 B2 * | 6/2009 | Selmen et al. | 208/49 |
| 8,658,019 B2 * | 2/2014 | Bridges et al. | 208/50 |
| 8,658,022 B2 * | 2/2014 | Bridges et al. | 208/67 |
| 8,658,023 B2 * | 2/2014 | Coleman | 208/73 |
| 8,663,456 B2 * | 3/2014 | Bridges et al. | 208/50 |
| 8,882,991 B2 * | 11/2014 | Kuechler et al. | 208/57 |
| 2002/0033356 A1 | 3/2002 | Honda et al. | |
| 2004/0164001 A1 | 8/2004 | Rhodey | |
| 2005/0241289 A1 * | 11/2005 | Briesch et al. | 60/39.182 |
| 2005/0261534 A1 | 11/2005 | Stell et al. | |
| 2005/0269244 A1 | 12/2005 | Zare | |
| 2007/0045155 A1 | 3/2007 | Selmen et al. | |
| 2008/0208527 A1 * | 8/2008 | Kavaklioglu | 702/179 |
| 2011/0230632 A1 * | 9/2011 | Abhari | 526/335 |
| 2011/0289897 A1 * | 12/2011 | Fujita et al. | 60/39.12 |

FOREIGN PATENT DOCUMENTS

| | | |
|---|---|---|
| EP | 1130080 | 9/2001 |
| WO | 97/08276 | 3/1997 |
| WO | 2007144661 | 12/2007 |

* cited by examiner

Figure 1

Annotated Sheet Showing Changes

Figure 2

Annotated Sheet Showing Changes

PROCESS AND APPARATUS FOR CO-PRODUCTION OF OLEFINS AND ELECTRIC POWER

CROSS REFERENCE TO RELATED APPLICATIONS

This application claims the benefit of and priority to U.S. Ser. No. 61/384,592, filed Sep. 20, 2010, and EP application No. 10189089.5, filed Oct. 27, 2010, the disclosures of which are herein incorporated by reference in their entirety.

FIELD OF THE INVENTION

The present techniques relate to the co-production of olefins and electric power. In particular, the present techniques involve a process for processing hydrocarbons in a manner that provides the co-production of olefins and electric power.

BACKGROUND OF THE INVENTION

The oil and gas industry desires to efficiently obtain and process hydrocarbons into desired products. Typically, hydrocarbon resources are located in remote locations, which may not have the utilities available to process the hydrocarbons into desired products. As a result, the hydrocarbons have to be transported via ship or other means to a processing facility, such as a refinery, which can convert the hydrocarbons into the desired products. As such, the transport of the hydrocarbons may involve transporting the hydrocarbons long distances, introducing additional delays and costs in handling the hydrocarbons, along with other inefficiencies.

Once transported to a refinery, different processes are applied to the hydrocarbons to convert them into different products. These processes generally involve the use of thermal changes and/or pressure changes to separate the hydrocarbons in various stages. In particular, the processing may be performed in an oil refinery, which converts or separates the hydrocarbons (e.g., crude oil) into different streams, such as gases, light naphtha, heavy naphtha, kerosene, diesel, atmospheric gas oil, asphalt, petroleum coke and heavy hydrocarbons. Similarly, if the processing is performed in a natural gas refinery, the natural gas may be converted into industrial fuel gas, ethane, propane, butanes and pentanes.

In conventional oil refineries, different units separate the hydrocarbons into the desired products. These units may include an atmospheric distillation unit, a vacuum distillation unit, a delayed coker, a hydrotreater, a merox treater, an isomerization unit, a catalytic reformer, a fluid catalytic cracker, an amine treater, a hydrocracker, and a steam cracker. Typically, the hydrocarbon feeds are passed through the atmospheric distillation unit to divide the hydrocarbons (e.g., crude oil) into gases, naphtha (e.g., light naphtha and heavy naphtha), kerosene/jet fuel, diesel oil, atmospheric gas oil and atmospheric resid or bottoms. As an example, the volume amounts of these products may be gases of 5 weight percent (wt %), naphtha of 20 wt % to 30 wt %, kerosene/jet fuel 5 wt % to 20 wt %, diesel oil of 15 wt % to 20 wt %, atmospheric gas oil of 20 wt % to 30 wt %, and atmospheric resid or bottoms of 5 wt % to 20 wt %. Each of the different percentages are a specific portion of the hydrocarbon feed. The amount of these different products may vary based on the different crude oil provided for processing in the system. Some conventional refineries may also include a vacuum distillation unit, a hydrotreater, a merox treater, a delayed coker, a fluid catalytic cracker and a hydrocracker, which are used to further separate products, such as light vacuum gas oil, heavy vacuum gas oil and vacuum residuum. The amount of these different products may vary based on the different crude oil provided for processing in the system.

Once the hydrocarbons have been separated, pyrolysis units are typically used to further process certain of the hydrocarbon feeds, such as naphtha, to produce olefins, which are the basic building blocks for other petrochemical products. As a specific example, a pyrolysis unit may be a steam cracking furnace that has two main sections: a convection section and a radiant section. The feed typically enters the convection section of the furnace where it is heated and mixed by direct contact with steam. The vaporized feed and steam mixture is then introduced into the radiant section where the cracking takes place. The resulting products leave the pyrolysis unit as effluent for further downstream processing.

Typical olefin systems receive and process a hydrocarbon feedstock, as noted above, to maximize the production of various products. While some of the initial feedstock is utilized for fuel for the process equipment within the refinery, the typical configurations attempt to minimize the amount of process fuel consumed to maximize the product yields. That is, existing processes burn fuel including fuel gas, fuel oil, crude oil in a boiler to generate steam, and use the steam with a turbine to generate power. As such, typical systems are configured to minimize the amount of the feedstock that is utilized for fuel to support the process.

What is needed is a method for processing hydrocarbons in a manner that provides the co-production of olefins and electric power because the demand for these products is growing faster than the demand for refinery fuel products. In particular, it may be desirable to construct a facility that processes hydrocarbons in more efficient manner, which produces electric power and desalinated water along with specific desired products.

SUMMARY OF THE INVENTION

The present techniques provide a process for co-production of olefins and electric power. This process comprises determining a separation level of a hydrocarbon feed; separating the hydrocarbon feed into a light fraction stream and a heavy fraction stream based on the determined separation level; generating electric power from at least a portion of the heavy fraction stream; and cracking at least a portion of the light fraction stream in a pyrolysis unit to produce an effluent comprising olefins. The determining the separation level may be based on olefin production requirements and electric power requirements, or may be based on a desired split for olefin production and power generation.

In another embodiment, the hydrocarbon processing system comprises a separation unit, process control unit, a pyrolysis unit, a fuel conversion unit and a turbine. The separation unit is configured to divide a hydrocarbon feed into a light fraction stream and a heavy fraction stream. The process control unit, having one or more control units, is configured to adjust the separation level in the separation unit based on olefin production requirements and electric power requirements. The pyrolysis unit is in fluid communication with the separation unit, wherein the pyrolysis unit is configured to create an effluent from a portion of the light fraction stream. The fuel conversion unit is in fluid communication with the separation unit and configured to convert a portion of the heavy fraction stream into a turbine feed. The turbine is in fluid communication with the fuel conversion unit and is configured to generate electric power with the at least a portion of the turbine feed.

In yet another embodiment, a process for co-production of olefins and electric power is provided. The process includes separating a hydrocarbon feed into a light fraction stream and a heavy fraction stream; generating electric power from at least a portion of the heavy fraction stream, wherein the at least a portion of the heavy fraction stream comprises between 35 wt % to 80 wt % of the hydrocarbon feed; and cracking at least a portion of the light fraction stream in a cracking reactor to produce an effluent comprising olefins, wherein the light fraction stream comprises between 20 wt % to the remaining portion of the hydrocarbon feed. The separation may be based on a predetermined separation level, which is based on olefin production requirements and electric power requirements, or on a desired split for olefin production and power generation.

In one or more of the embodiments, a control mechanism may be utilized to manage the separation level. The control mechanism may include a process control unit comprising one or more measurement devices that measure operational data and one or more control units for adjusting operational settings, wherein the devices and units may communicate with each other. The process control unit may include a temperature measurement device configured to measure the temperature of the hydrocarbon feed prior to the separation unit. The one or more control units may comprise a dilution control unit configured to adjust the amount of a fluid mixed with the hydrocarbon feed prior to the separation unit. The process control unit may include a computer system having a set of instructions to calculate the amount of the fluid to be mixed with the hydrocarbon feed based on the separation level and the measured temperature; and/or communicate the adjustment to the dilution control unit. Further, the process control unit may include a hydrocarbon feed measurement device configured to measure flow rate of the hydrocarbon feed prior to the separation unit; a light fraction measurement device configured to measure flow rate of the at least a portion of the light fraction stream prior to the pyrolysis unit; and wherein the one or more control units comprise a light fraction control unit configured to adjust the flow rate of the at least a portion of the light fraction stream based on the determined separation level, the measured flow rate of the hydrocarbon feed, and/or the measured flow rate of the at least a portion of the light fraction stream. The process control unit comprises a computer system having a set of instructions, which may be stored in memory and accessed via a processor, to calculate the amount of adjustment to the flow rate of the at least a portion of the light fraction stream based on the determined separation level, the measured flow rate of the hydrocarbon feed, and/or the measured flow rate of the at least a portion of the light fraction stream; and communicate the adjustment to the light fraction control unit.

The invention will be described in connection with its preferred embodiments of the present techniques. However, to the extent that the following detailed description is specific to a particular embodiment or a particular use, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

Unless otherwise stated, all percentages, parts, ratios, etc., are by weight. Unless otherwise stated, a reference to a compound or component includes the compound or component by itself, as well as in combination with other compounds or components, such as mixtures of compounds.

Further, when an amount, concentration, or other value or parameter is given as a list of upper preferable values and lower preferable values, this is to be understood as specifically disclosing all ranges formed from any pair of an upper preferable value and a lower preferable value, regardless whether ranges are separately disclosed.

The term "steam cracker" as used herein is also known more generally as a thermal pyrolysis unit. Steam, although optional, is typically added to reduce hydrocarbon partial pressure, to control residence time, and to minimize coke formation. In preferred embodiments the steam may be superheated, such as in the convection section of the pyrolysis unit, and/or the steam may be sour or treated process steam.

The terms "flash drum", "flash pot", "knock-out drum" and "knock-out pot" are used interchangeably herein; they are well-known in the art. In a preferred embodiment, the composition of the vapor phase leaving the flash drum is substantially the same as the composition of the vapor phase entering the flash drum, and likewise the composition of the liquid phase leaving the flash drum is substantially the same as the composition of the liquid phase entering the flash drum, i.e., the separation in the flash drum consists essentially of a physical separation of the two phases entering the drum.

The term "nominal final boiling point" shall mean the temperature at which 99.5 wt % of a particular sample has reached its boiling point.

The terms "convert," "converting," "crack," and "cracking" are defined broadly herein to include any molecular decomposition, breaking apart, conversion, dehydrogenation, and/or reformation of hydrocarbon or other organic molecules, by means of at least pyrolysis heat, and may optionally include supplementation by one or more processes of catalysis, hydrogenation, diluents, stripping agents, and/or related processes.

The term "resid" as used herein, includes hydrocarbon components having a final or end boiling point above 500° C., or in some embodiments above 565° C., or higher (e.g., including atmospheric and vacuum resid and higher boiling compounds), and including the weight of non-volatizable fractions or components such as metals.

As used herein, non-volatile components are the fraction of the hydrocarbon feed with a nominal boiling point above 590° C. as measured by ASTM D-6352-98 or D-2887. The boiling point distribution of the hydrocarbon feed is measured by Gas Chromatograph Distillation (GCD) according to the methods described in ASTM D-6352-98 or D-2887, extended by extrapolation for materials boiling above 700° C. Non-volatile components can include coke precursors, which are moderately heavy and/or reactive molecules, such as multi-ring aromatic compounds, which can condense from the vapor phase and then form coke under the operating conditions encountered in the present techniques.

The present techniques are suitable for use with substantially any hydrocarbon feed. Examples of applicable hydrocarbon feeds include but are not limited to one or more of gases, naphtha (e.g., light naphtha and heavy naphtha), kerosene, jet fuel, diesel oil, atmospheric gas oil, atmospheric resid or bottoms, vacuum resid, gas oils, heating oil, gasoline, hydrocrackate, raffinate reformate, natural gasoline, distillate, naphtha, crude oil, crude blends, pitch, tars, asphaltenes, other distillate and fractionate bottoms, virgin naphtha, wide boiling range naphthas, heavy non-virgin hydrocarbon streams from refineries, vacuum gas oil, heavy gas oil, naphtha contaminated with crude, heavy residuum, C4's/residue admixture, condensate, contaminated condensate, naphtha residue admixture and mixtures thereof. At least a portion of the hydrocarbon feed may have a nominal end boiling point of at least 500° C., or of at least 350° C., or often at least 200° C., and may commonly have a nominal end boiling point of at least 260° C. Some preferred hydrocarbon feeds include but are not limited to crude oil, atmospheric resids, contaminated condensate, naphthas, natural gasolines, gas oil distillates, fuel oils, and mixtures thereof. The vaporized hydrocarbon feed may be supplemented with substantially any other hydrocarbon co-feed material that does not contain non-volatiles that undergo the thermal cracking.

In other aspects, the hydrocarbon feed may include or substantially comprise a whole crude oil, an atmospheric residuum, or blend thereof. There may be other components present, such as nitrogen according to ASTM D4629, metals such as vanadium and nickel measured by atomic absorption, seawater and sediment, the latter two which are preferably removed by means well known to the skilled artisan. Regardless, the heavy hydrocarbon feed may include the non-volatile components contained in the hydrocarbon feed.

The present technique relates to the co-production of olefins and electric power based on a hydrocarbon feed, operational settings and may be based on operational data. The hydrocarbon feed, which is described above, may include different types of feed and mixtures thereof. The present techniques involve separating the hydrocarbon feed into at least one light fraction stream that is at least partially used to produce olefins and at least one heavy fraction stream that is at least partially used in generating electric power. In some embodiments of the present techniques, the portion of the heavy fraction stream that is utilized for power generation may include about 35 wt % to 80 wt % of the hydrocarbon feed, preferably 45 wt % to 70 wt % of the hydrocarbon feed, or more preferably 50 wt % to 60 wt % of the hydrocarbon feed. The portion of the light fraction stream that is utilized to produce olefin may include 20 wt % to the remaining portion of the hydrocarbon feed, preferably 30 wt % to the remaining portion of the hydrocarbon feed, or more preferably 40 wt % to the remaining portion of the hydrocarbon feed. The remaining portion of the hydrocarbon feed being the portion not separated into the heavy fraction stream for power generation.

Beneficially, the present techniques provide various advantages over conventional refinery processes. For instance, the present techniques provide a refinery configuration that is self-sufficient and operable to generate electric power from the hydrocarbon feeds, while producing specific desired products, such as specific chemicals products. Unlike conventional processes that maximize the material provided to the pyrolysis unit, the present techniques involve determining an appropriate separation level for the hydrocarbon feed to provide a specific amount of electric power, which may be provided to processing units and other sources, and using at least a portion of the remaining hydrocarbon feed (e.g., a portion of the at least one light fraction stream) in the production of olefins via a pyrolysis unit.

Furthermore, the present techniques also provide flexibility in managing the production of desired chemical products from the hydrocarbon feed. That is, the process may maximize the production of chemicals and electric power, while minimizing the production of fuel distillates, such as motor gasoline, jet fuel, kerosenes, and diesel, as well as consuming fuel oil. By processing the hydrocarbon feed in this manner, the resulting products from the process may be managed to provide chemical products along with smaller amounts, if any, of other products.

Moreover, this configuration may also be used to reduce costs for processing hydrocarbons. In particular, the present techniques may reduce transportation costs. In one or more of the embodiments, only the volume of specific chemical products produced have to be transported to delivery locations, as opposed to the transporting of the total volume of hydrocarbons to a remote refinery, as in some conventional systems. In this manner, the distance and volume of transported products may be managed to provide efficiencies for the overall system. Further, the proposed process provides an efficient mechanism for managing the hydrocarbon feed with fewer units. As noted above, certain embodiments involve separating the hydrocarbon feed into two different streams, while conventional systems include various units, such as an atmospheric distillation unit, to separate the hydrocarbon feed into many different products. As may be appreciated, these specific embodiments do not require the level of separation typically utilized in conventional oil refineries, which reduces the number of units utilized in processing the hydrocarbon feed and the complexity of the units, as well. As a result, the proposed process is more cost effective than conventional systems.

To provide the appropriate separation of the hydrocarbon feed, operational settings may be adjusted to manage the separation level within the system and to manage the operating parameters. That is, operational settings may be adjusted in the system to further refine the separation of the at least one light fraction stream and at least one heavy fraction stream. These operating parameters may include monitored values, which are stored as operational data in the memory, and utilized by a control mechanism (that may include a computer system along with one or more monitors and/or measuring devices coupled with valves and other devices) to adjust operational settings to manage the separation of the hydrocarbons into the light stream and the heavy fraction stream.

The present techniques may monitor certain operating parameters and adjust operational settings to provide an enhanced process. For instance, depending on market conditions, seasonal variations, supply and demand of various products, and other aspects, this process provides the flexibility to adjust the ratio of chemicals products and electric power to optimize the system to provide the desired products and maximize profit. Other more complex units and processing schemes are configured to produce many different products, which constrains them because of the demands for volumes of those products. However, unlike a conventional refinery that has many products to provide, the present techniques provide a mechanism to separate the hydrocarbon feed into two primary products, which are power and chemical products. The present techniques may be further understood with reference with the FIGS. 1-4, which are discussed below.

Figure 1:
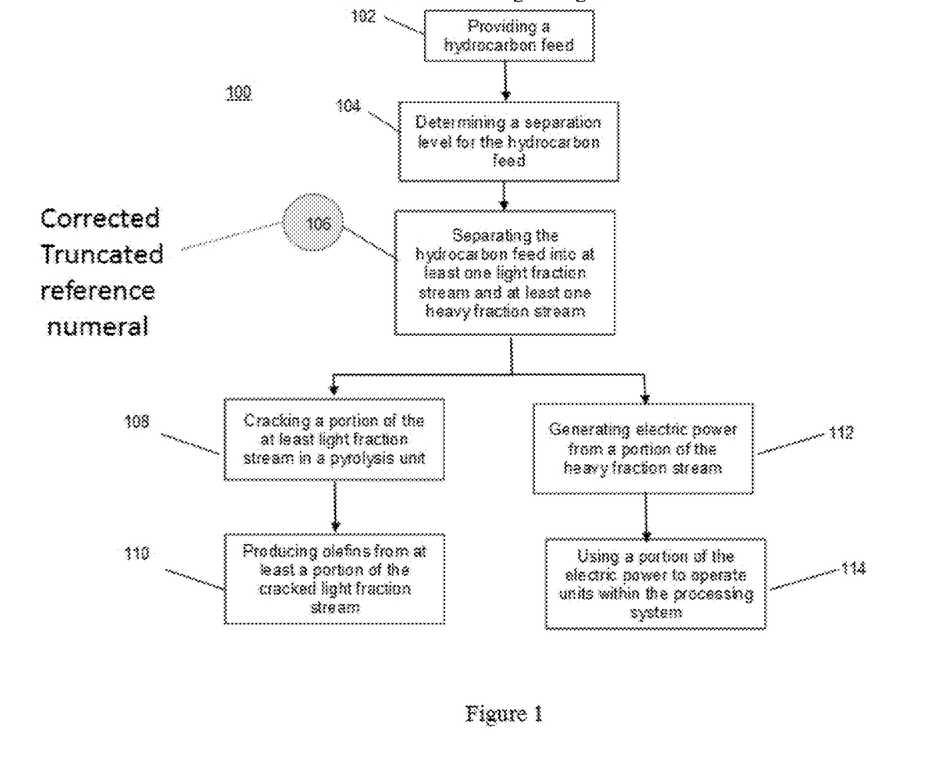
FIG. 1 is a block flow diagram relating to a process for co-producing electric power along with olefins according to an exemplary embodiment of the present techniques.

To begin, an exemplary embodiment of the present techniques is illustrated in the block flow diagram 100 of FIG. 1.

In this flow diagram 100, a process for co-producing electric power along with olefins from an initial hydrocarbon feed is described. As part of the process, a separation unit may be used to divide a hydrocarbon feed into at least one light fraction stream and at least one heavy fraction stream, as describes in blocks 102-106. Then, as noted in blocks 108 and 110, at least a portion of the at least one light fraction stream may be cracked in a pyrolysis unit to generate olefins. Also, at least a portion of the at least one heavy fraction stream may be used to generate electric power, as discussed in blocks 112 and 114.

A hydrocarbon feed is provided at block 102. The hydrocarbon feed may include the various fractions, as noted above, or may specifically include crude oil, crude blends or mixtures thereof, for example. At block 104, a separation level is determined to divide the hydrocarbon feed into at least one light fraction stream (e.g., a light fraction stream) and at least one heavy fraction stream (e.g., a heavy fraction stream). This separation level may be based on olefin production requirements, electric power requirements, or both. The olefin production requirements may include specific amounts of olefins to be provided to maintain a predetermined olefin production level. The predetermined olefin production level may include different amounts based on customer sales or exports, and/or requirements for other chemical downstream derivatives products, which may include other units utilized to produce other chemicals products, such as propylene. The electric power requirements may include a predetermined power production level. The predetermined power production level may include specific amounts of power to be generated to operate the units within the system, to operate units within the refinery, to provide power to a power grid outside the refinery. The power provided to the power grid may be specified by a contract or agreement with a municipal power company.

The determination of the separation level may further include a determination of the composition of the hydrocarbon feed. That is, the separation level may be based on the light fraction composition, wherein the more saturated components present, particularly paraffins, more particularly normal paraffins, along with the hydrogen content according to ASTM D4808, wherein a higher content of said molecules and atomic hydrogen content generally indicates higher olefin production capability. Typical hydrogen content may range from 12 wt % to 16 wt %, preferably 12.5 wt % to 15 wt %, or more preferably between 13 wt % and 14.5 wt % for the light fraction. The separation level may also involve determining the heavy fraction composition and properties, some of which are, but not limited to, sulfur, nitrogen, and metals levels, asphaltenes content, viscosity, and heating value, which are specified by burner design and environmental limits for the combustion of the heavy fraction to provide the heat necessary for power production. By considering the specific properties of the heavy fraction stream and the light fraction stream, the optimal separation level may be determined.

To provide the separation, operating parameters may be monitored and adjusted to vary the separation level. The operating parameters may include temperature of the hydrocarbon stream or different streams forming the one or more light fraction streams and/or the one or more heavy fraction streams, pressures within different vessels along the flow path to the separation unit or within the separation unit. These operating parameters may be monitored, stored in memory as operational data, and utilized to adjust operational settings, which may be stored in memory, via a computer system. The control mechanism or process control unit may include a computer system, one or more monitors and/or measuring devices coupled with valves and other devices to manage the separation of the hydrocarbons into the light fraction stream and the heavy fraction stream. The determination of the separation level may be calculated by the computer system in the process control unit, prior to the hydrocarbon feed being provided to the separation unit, prior to offloading the feed, or prior to purchasing the hydrocarbon feed. Further, the determination of the separation level may be adjusted in real time or concurrently with the processing of the hydrocarbon feed, depending on the specific configuration.

Then, at block 106, the hydrocarbon feed may be separated into the at least one light fraction stream and the at least one heavy fraction stream based on the separation level. This separation may occur in a separation unit prior to the hydrocarbon feed entering a pyrolysis unit, in a separation unit in fluid communication between the convection section and the radiant section of the pyrolysis unit or at another suitable location prior to the radiant section of the pyrolysis unit. As discussed above, this separation may be managed through the adjustment of the operating settings, which is discussed further below for different embodiments.

Once separated, the at least one light fraction stream may be further processed, as discussed in blocks 108 and 110. At block 108, a portion of the at least one light fraction stream is cracked to produce an effluent. This cracking process may include gas cracking, steam cracking, or liquid cracking, as may be appreciated by those skilled in the art. Then, the effluent (e.g., the cracked light fraction) may be further processed to produce olefins, as shown in block 110. As a specific example, U.S. Patent App. No. 2007/0007174 is an exemplary cracking process that may be used with the present techniques. As may be appreciated, the olefins may be used within the refinery system to generate different chemical products, as is known to those skilled in the art.

The at least one heavy fraction stream may be further processed, as discussed in blocks 112 and 114. At block 112, at least a portion of the at least one heavy fraction stream is used to generate electric power. The portion of the at least one heavy fraction stream may optionally be supplemented by steam cracked gas oils and tars from the pyrolysis unit if necessary to produce the required amount of electric power. This electric power generation may involve providing a portion of the at least one heavy fraction stream to one or more boilers and using the steam generated from the boilers to drive one or more turbines to generate electric power. Further, the at least one heavy fraction stream may be provided to a partial oxidation unit to produce syngas, a product rich in hydrogen and carbon monoxide, to drive a gas turbine and which may further be used as fuel gas in the processing units, or moreover used as a cogeneration fuel to produce steam after driving the turbine. Then, the electric power generated may be used within the processing system to operate units, as shown in block 114. The units may include motors for pumps and valves, control systems, monitors, other electrical components and the like. The power may also be provided to an electric power grid for distribution to other customers.

Figure 3:
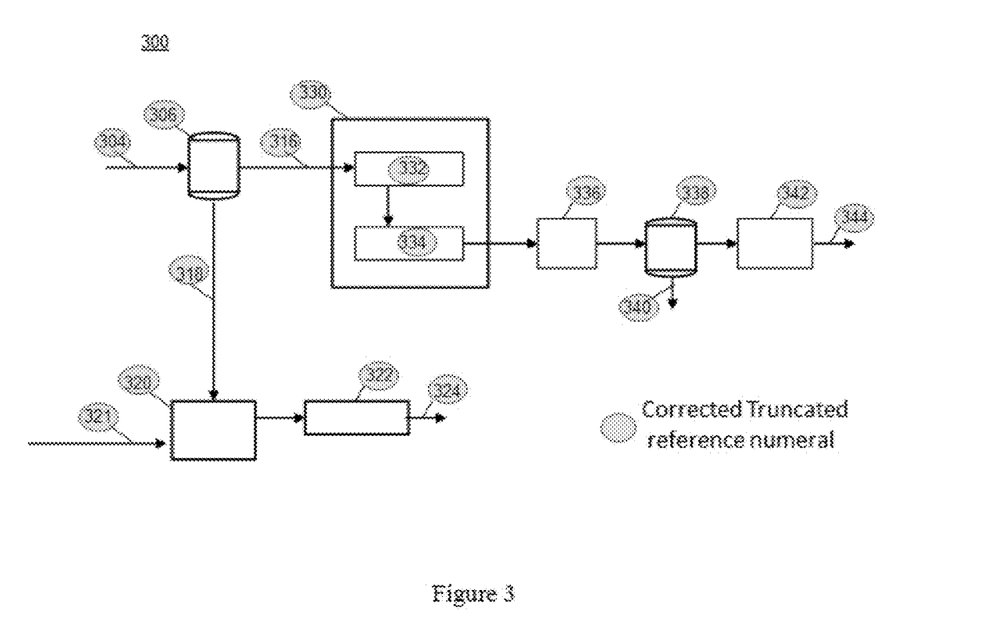
FIG. 3 is a block flow diagram relating to another exemplary configuration for co-producing electric power along with olefins in accordance with the present techniques.
Figure 4:
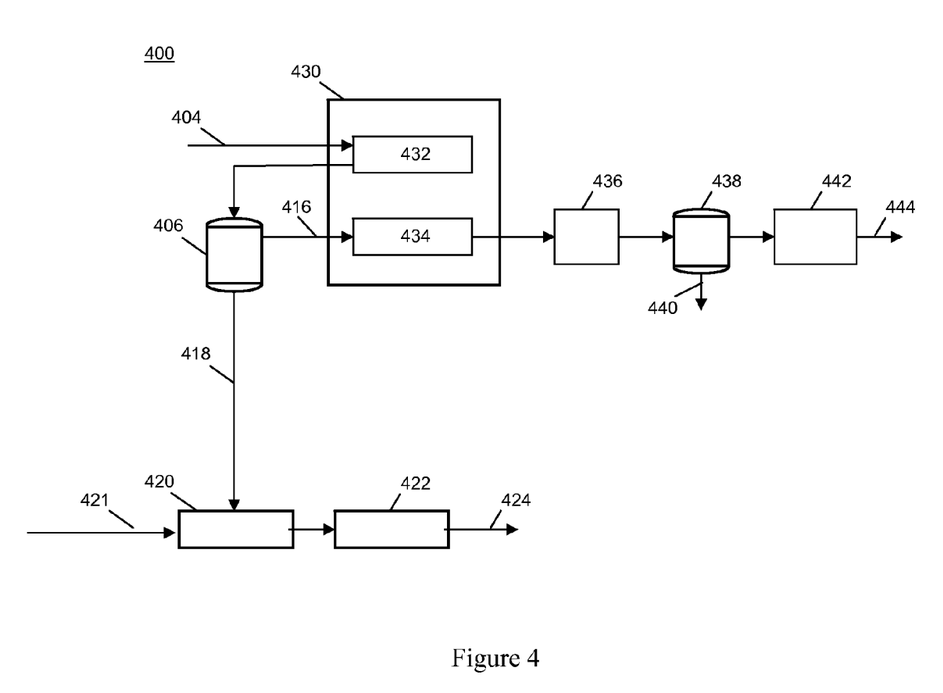
FIG. 4 illustrates a schematic flow diagram of an exemplary embodiment with a steam cracker in accordance with the present techniques.

As noted above, the separation of the at least one light fraction stream and the at least one heavy fraction stream may be based on the requirements for electric power and the requirements for olefin production. If power is only being used to drive the processes co-located with the electricity production unit, the split (e.g., separation level) can be affected to separate out only the weight of the at least one heavy fraction necessary to meet this demand. If power is being sold to other users, such as industrial customers or the common grid, then the split (e.g., separation level) can be affected so as to maximize the profit between electricity sales and olefins production based upon the above discussed properties of the at least one light fraction and at least one heavy fraction. As a specific example of an embodiment of the present techniques, FIGS. 2-4 provide exemplary flow diagrams of systems for the co-production of electric power and olefins.

Figure 2:
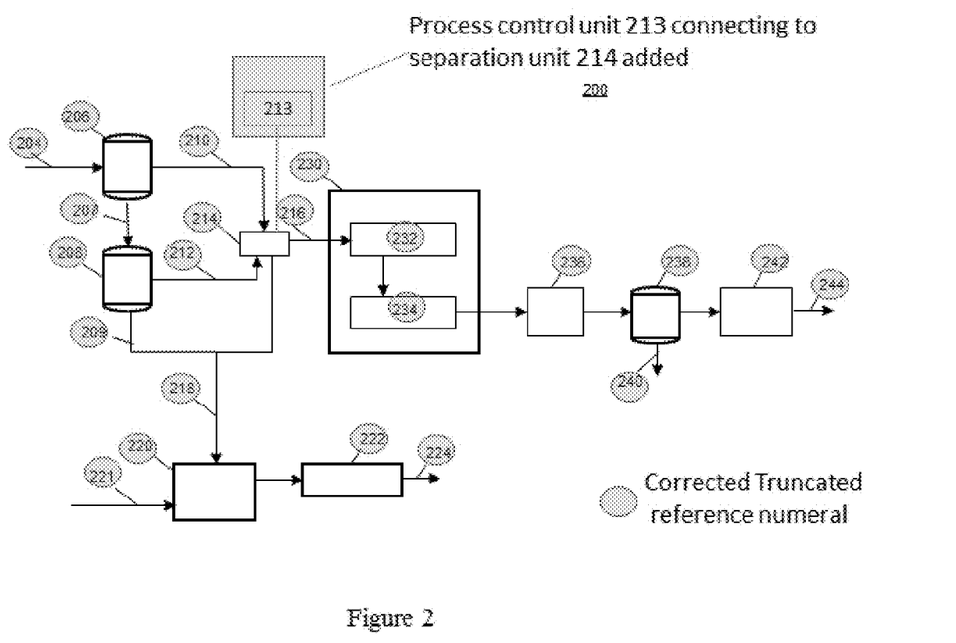
FIG. 2 is a block flow diagram relating to one exemplary configuration for co-producing electric power along with olefins in accordance with the present techniques.

To begin, FIG. 2 is a flow diagram relating to one exemplary configuration 200 of a system that may be used to co-produce electric power along with olefins in accordance with the present techniques. In this configuration, the hydrocarbon feed is provided via line 204 to an atmospheric distillation unit 206 and may also be provided to a vacuum distillation unit 208 to separate the hydrocarbon feed into a vacuum bottoms stream 209 and one or more distillates. As noted above, conventional systems provide naphtha or gas oil distillates from the unit 206 to a pyrolysis unit 230 to produce olefins. However, in this embodiment, the hydrocarbon feed is divided into a light fraction stream and a heavy fraction stream. The light fraction stream represents at least one light fraction stream and the heavy fraction stream represents at least one heavy fraction stream. However, it should be appreciated that the heavy fraction stream may include one or more heavy fraction streams, while the light fraction stream may include one or more light fraction streams. That is, the hydrocarbon feed into multiple heavy fraction streams and/or multiple light fraction streams.

To operate, the hydrocarbon feed is provided to an atmospheric distillation unit 206 via line 204 to divide the hydrocarbon feed into an atmospheric distillate stream and an atmospheric bottom stream. While the atmospheric distillate stream is shown as a single stream provided via line 210 for simplicity, this stream may include any number of different streams. As an example, the atmospheric distillate stream 210 may include a gas stream, naphtha stream, kerosene/jet fuel stream, diesel stream, and atmospheric gas oil stream, while an atmospheric bottom stream may includes atmospheric resid or bottoms. Operating temperatures and pressures of the atmospheric distillation unit as well as boiling ranges of the various distillate streams are well known by those skilled in the art. While each of these distillate streams is not individually shown, as may be appreciated by those skilled in the art, these different streams may be provided to different units for further processing. These units may include a hydrotreater, merox treater, fluid catalytic cracker, isomerization, catalytic reformer, amine treater and hydrocracker. The amount of these different products may vary based on the different crude oil provided for processing in the system.

The atmospheric bottom stream from the atmospheric distillation unit 206 may be provided via line 207 to the vacuum distillation unit 208 to divide the atmospheric bottom stream into a vacuum distillate stream and a vacuum residuum stream. While the vacuum distillate stream is shown as a single stream provided via line 212 for simplicity, this stream may include any number of streams. Operating temperatures and pressures of the vacuum distillation unit as well as boiling ranges of the various distillate streams are well known by those skilled in the art. As an example, the vacuum distillate stream may include a light vacuum gas oil stream and a heavy vacuum gas oil stream, which may be further processed in other units (not shown). These units may include a hydrotreater, fluid catalytic cracker and hydrocracker, for example. The amount of these different products may vary based on the different atmospheric bottom stream provided from the atmospheric distillation unit 206.

Regardless, the atmospheric distillate stream and vacuum distillate stream are provided to a separation unit 214 that manages the flow of the different streams into the light fraction stream provided via line 216 and a portion of the heavy fraction stream provided via line 218. That is, the mixing of the different streams into the light fraction stream and the heavy fraction stream may be performed in the separation unit 214. The separation unit 214 may be a manifold or mixing unit with different valves to control the flow of the different streams into the light fraction stream and/or the heavy fraction stream.

To manage the separation level of the hydrocarbon feed, the separation unit 214 may use different combinations of the atmospheric distillate and vacuum distillate streams. That is, the separation unit 214 may manage the separation level to increase and/or decrease the generation of electric power with the heavy fraction stream or decrease and/or increase the production of olefins with the light fraction stream. For example, the separation unit 214 may be configured to separate a portion of the atmospheric distillate streams along with one or more of the vacuum distillate streams, if any, into the light fraction stream, while the vacuum residuum stream and any of the atmospheric distillate streams and/or vacuum distillate streams, if any, not provided to the light fraction stream may be separated into the heavy fraction stream. Alternatively, the separation unit 214 may be configured to separate one or more atmospheric distillate streams into the light fraction stream, while the atmospheric bottom stream and any vacuum distillate unit streams or any remaining atmospheric distillate streams may be separated into the heavy fraction stream. It should be noted that the mixing of streams may include any combination of the above mentioned streams, which preferably does not include non-volatiles as part of the light fraction stream.

To generate electric power, at least a portion of the heavy fraction stream may be provided to the fuel conversion unit 220, which may be a boiler or partial oxidation unit, via line 218 to be used as utility feed in the generation of turbine feed, which may be steam or syngas. If the fuel conversion unit 220 is a boiler, it may receive boiler water feed via line 221, such as water or steam as the utility feed, and burn the at least a portion of the heavy fraction stream to generate steam from the boiler water feed that is used to drive the turbine. If the fuel conversion unit 220 is a partial oxidation unit, it may receive oxygen via line 221 and react with the at least a portion of the heavy fraction stream to produce syngas that is used to drive the turbine 222 after it is treated for impurities. The turbine 222 may use the turbine feed (e.g., steam or syngas) provided from the fuel conversion unit 220 to generate electric power. This electric power may be used to provide electricity or electric power via line 224 for use at the facility for pumps, compressors, and other units (not shown) that operate the refinery and/or the electricity may be transmitted to a power distribution system to other facilities or locations.

To produce olefins, at least a portion of the light fraction stream may be provided to a convection section 232 and then to a radiant section 234 of a pyrolysis unit 230. The convection section 232 may be used to heat the portion of the light fraction stream and the radiant section 234 may be used to thermally decompose the provided light fraction stream, as is known in the art. As an example, the convection section 232 may heat the hydrocarbon feed to a temperature in a range from 482° C. to 593° C., preferably a range from 538° C. to 621° C., or more preferably a range from 593° C. to 677° C., while the radiant section may heat the provided light fraction to temperatures between 788° C. and 871° C. The pressure in the radiant section 234 may be set and controlled at between about 20 pounds per square inch absolute (psia) and about 40 psia (138 kilopascals (kPa) and 276 kPa) based upon downstream pressure drops and process gas compressor suction pressure. Other suitable pressures may be utilized. The convection section pressure is dependent on these constraints and hydraulic considerations, which are known in the art.

Then, the cracked effluent is provided to a heat exchanger 236 to cool the effluent before it is flashed at a vapor/liquid separation unit 238. The vapor/liquid separation unit 238 may be used to separate the liquid effluent (e.g., the bottom stream) from the vapor effluent. The bottom stream provided via line 240 may be used as fuel for the furnace of the pyrolysis unit 230 or may be further processed in one or more units to separate other components or can be supplemental feed provided to fuel conversion unit 220 to generate electric power. The vapor effluent may be further processed in other units, such as a fractionator 242. The fractionator may be used to separate the effluent into various components by their respective boiling points. The separated streams, e.g., stream 244, from the fractionator 242 may be further processed in other units into olefins.

Beneficially, the configuration provides flexibility in controlling the different streams that are combined to form the light fraction stream and the heavy fraction stream. In this manner, the amount of hydrocarbon feed provided to the pyrolysis unit 230 to produce olefins and provided to the fuel conversion unit 220 and turbine 222 for the generation of electric power may be managed in a more efficient manner, without the production of undesired products, which is further discussed in the discussion below.

As noted above, the separation level may be determined and adjusted based on various operating parameters, which are monitored and stored in memory. The operating parameters may include operational data provided by various measuring devices or operational settings associated with the different units within the system 200. As an example, the operating parameters may include the measured temperature and/or measured pressure of the hydrocarbon feed being divided in the atmospheric distillation unit 206 and/or the vacuum distillation unit 208, the measured composition of the hydrocarbon feed being provided to the atmospheric distillation unit 206, the measured flow rate of the hydrocarbon feed to the atmospheric distillation unit 206, the measured flow rate of the light fraction stream being provided to the pyrolysis furnace 230, and the measured flow rate of the heavy fraction stream to the fuel conversion unit 220. Further, the operating parameters may include the operational setting for temperature and/or pressure the atmospheric distillation unit 206 and/or the vacuum distillation unit 208, the operational setting for flow rate of the hydrocarbon feed to the atmospheric distillation unit 206, the operational setting for flow rate of the light fraction stream being provided to the pyrolysis furnace 230, and the operational setting for flow rate of the heavy fraction stream to the fuel conversion unit 220.

To determine the separation level, the operating parameters may be utilized alone or with other information. For instance, the determination of the desired separation level may involve a calculation based on the operational data and/or the operational settings, which may be stored on the process control unit's computer system. This calculation of the separation level may be further based on the olefin production requirements, the electric power requirements and/or other factors, such as design limitations of the materials used and/or capacity of the equipment involved in processing the light and heavy fraction stream.

As an exemplary embodiment, if the hydrocarbon feed is crude oil, the operating parameters used to provide the separation level may be the composition of the hydrocarbon feed. The hydrocarbon feed in this example may be separated in the atmospheric distillation unit 206 gases of 5 wt %, naphtha of 20 wt % to 30 wt %, kerosene/jet fuel 5 wt % to 20 wt %, diesel of 15 wt % to 20 wt %, atmospheric gas oil of 20 wt % to 30 wt %, and atmospheric resid or bottoms of 5 wt %-20 wt % (where the total percentages are 100 wt % of the hydrocarbon feed). The vacuum distillation unit 208 may further separate the atmospheric resid into different vacuum distillate products, which may be light vacuum gas oil of 20 wt % to 40 wt %, heavy vacuum gas oil of 30 wt % to 50 wt %, and a vacuum residuum of 5 wt % to 40 wt % (where the total percentages are 100 wt % of the atmospheric resid). With this hydrocarbon feed composition, the separation unit 214 may be configured to provide the gases and naphtha (e.g., 25 wt % to 35 wt % of the hydrocarbon feed) to the pyrolysis furnace 230 as the light fraction stream, while the other atmospheric distillates and/or vacuum distillate streams may be provided to the fuel conversion unit 220. Moreover, the gases, naphtha, and atmospheric distillates, and even the vacuum distillates, can be provided to the pyrolysis furnace 230 depending on the desired split fraction (e.g., separation level), with the limitation that the non-volatile vacuum resid is provided as part of the heavy fraction stream or may be further processed in other units.

As may be appreciated, in other examples, the at least one light fraction stream may include one or more atmospheric distillate streams, such as streams of gases, naphtha, kerosene/jet fuel, diesel, atmospheric gas oil, and may also include vacuum distillate streams, such as streams of light vacuum gas oil and/or heavy vacuum gas oil. The at least one heavy fraction stream may include the vacuum residuum stream, one or more vacuum distillate streams, such as streams of light vacuum gas oil and/or heavy vacuum gas oil, and/or one or more of the atmospheric distillate streams, as well.

Further, as another exemplary embodiment, a control mechanism may be utilized with this configuration to determine the separation level, monitor the operating parameters and adjust operational settings. As an example, a process control unit, which may be one embodiment of a control mechanism, may include a computer system coupled to one or more measurement devices associated with one or more units within the system and/or one or more control units associated with one or more units within the system. The computer system may have memory for storing instructions (e.g., a computer program or application), a processor for executing the instructions, a display, a user interface device, communication components to communicate with the control devices and measurement devices, and other suitable components. The instructions stored in the memory may include a set of instructions configured to obtain the operational data from one or more measuring devices, obtain the operational settings from one or more control units, calculate a separation level, and adjust the operational settings for one or more control units.

As a specific example, the process control unit 213 may include a computer having a set of instructions in memory, which are configured to manage control units, to obtain operational data from measuring devices and calculate a separation level. The calculated separation level may be based on the flow rate within the system 200. In particular, the flow rate of the hydrocarbon feed along the line 204 may be monitored by a feed measuring device prior to the atmospheric distillation unit 206. The flow rate of the light fraction stream along the line 216 may be monitored by a light fraction measuring device along the line 216 prior to the pyrolysis furnace 230, while the flow rate of the heavy fraction stream may be monitored along the line 218 by a heavy fraction measuring device prior to the fuel conversion unit 220. Based on the operational data from these measuring devices, the computer system of the process control unit 213 may calculate a separation level or access a previously determined separation level. A comparison of the operational data (e.g., flow rates for this example) and the desired separation level may be performed, which may be a difference comparison or other suitable comparison. Based on the comparison, the computer system of the process control unit 213 may adjust the flow valves coupled along the lines 216 or 218 to increase or decrease the flow of the light fraction stream, heavy fraction stream, and/or a combination of both. As another possible adjustment, if the separation unit 214 is a manifold or other device with one or more valves for each of the light fraction streams and/or the heavy fraction streams, the process control unit 213 may adjust the different distillates being routed to the pyrolysis furnace 230 and/or fuel conversion unit 220. Accordingly, in this configuration, the flow rate may be used to manage the separation level.

As may be appreciated, the operational data may be obtained by monitoring other types of measuring devices coupled to the different units or lines. The measuring devices monitor temperature, pressure or other suitable operational parameters, which are then stored in memory, which may be within the measuring device or transmitted to the computer system of the process control unit. For example, the measuring devices may include monitoring the pressure within the units 206, 208 and/or 214 utilized to separate different streams, the partial pressure of the hydrocarbon feed in the units 206, 208 and/or 214, and/or the amount of dilution fluid mixed with the streams at various points within the process prior to separation.

FIG. 3 is a block flow diagram relating to another exemplary configuration 300 for co-producing electric power along with olefins in accordance with the present techniques. Similar to the discussion related to FIG. 2, this diagram 300 separates the hydrocarbon feed into a light fraction stream and a heavy fraction stream. The heavy fraction stream may be provided to a fuel conversion unit 320, which may be a boiler or partial oxidation unit, via line 318 to heat boiler water feed provided via line 321 into steam or react with oxygen provided via line 321 to produce syngas for use in a turbine 322 that generates electric power 324. The light fraction stream may be provided via line 316 to a pyrolysis unit 330 having a convection section 332 and a radiant section 334, a heat exchanger 336, and a vapor/liquid separation unit 338 that separates a bottoms stream via line 340 from the vapor effluent, which is provided to a fractionator 342, which provides product effluent 344. As may be appreciated, the processing of the light fraction stream and heavy fraction stream may be processed with units operating similar to the discussion of FIG. 2. However, in diagram 300, the separation process is a simplified method that involves a single separation unit 306 that divides the hydrocarbon feed into a single light fraction stream and a single heavy fraction stream. That is, the result of the separation in this configuration consists essentially of a light fraction stream and heavy fraction stream without involving the separation of individual distillates (e.g., without atmospheric distillation tower and/or a vacuum distillation tower). The temperature utilized to enact this separation normally ranges between 260° C. and 480° C. dependent upon the desired split fraction (e.g., separation level), which may be based on olefin production requirements and electric power requirements. The pressure in separation unit 306 may be utilized to change the separation level over a range of 5 pounds per square inch absolute (psia) vacuum up to 200 psia. The pressure utilized should also include hydraulic considerations for downstream processing units.

In this configuration 300, a hydrocarbon feed is provided via line 304 to a separation unit 306. This separation unit 306 may include a simple vapor/liquid separator, or "flash drum", or "knock-out pot", or could possibly be a trayed distillation column to provide a more precise separation. From the separation unit 306 a light fraction stream is provided via line 316 to the pyrolysis unit 330 and the heavy fraction stream is provided via line 318 to the fuel conversion unit 320. Each of these streams may be processed in a manner similar to the discussion of FIG. 2.

To manage the separation in this configuration, the operating parameters, such as temperature, pressure and flow rate, may be manipulated to affect the thermodynamic properties of the hydrocarbon feed to adjust the separation level for the light fraction stream and heavy fraction stream.

As noted above, the separation level may be determined and adjusted based on various operating parameters. In this configuration, the operating parameters may include the measured temperature and/or measured pressure of the hydrocarbon feed being divided in the separation unit 306, the measured composition of the hydrocarbon feed being provided to the separation unit 306, the measured flow rate of the hydrocarbon feed to the separation unit 306, the measured flow rate of the light fraction stream being provided to the pyrolysis furnace 330, and the measured flow rate of the heavy fraction stream to the fuel conversion unit 320. Further, the operating parameters may include the operational setting for temperature and/or pressure the separation unit 306, the operational setting for flow rate of the hydrocarbon feed to the separation unit 306, the operational setting for flow rate of the light fraction stream being provided to the pyrolysis furnace 330, and the operational setting for flow rate of the heavy fraction stream to the fuel conversion unit 320.

Again, the determination of the separation level may involve a calculation based on the operational data, the operational settings and/or other information, such as olefin production requirements, the electric power requirements and/or other factors.

As an example, if the hydrocarbon feed is crude oil, the operating parameters used to provide the separation level may be the composition of the hydrocarbon feed. The hydrocarbon feed may be separated in the separation unit 306 to have the heavy fraction stream being about 35 wt % to 80 wt % of the hydrocarbon feed, preferably 45 wt % to 70 wt % of the hydrocarbon feed, or more preferably 50 wt % to 60 wt % of the hydrocarbon feed. The resulting light fraction stream may be between 20 wt % to the remaining portion of the hydrocarbon feed, preferably 30 wt % to the remaining portion of the hydrocarbon feed, or more preferably 40 wt % to the remaining portion of the hydrocarbon feed. The final boiling point of the light fraction stream can be as low as 180° C. to include light gases naphtha or 350° C. to include gases, naphtha, and atmospheric distillates or as high as 600° C. to include gases, naphtha, atmospheric distillates, and vacuum distillates, depending on the desired split fraction to meet olefins and electricity requirements, and provided that the vacuum resid is not processed in the pyrolysis unit. That is, this configuration provides a simple mechanism to separate the hydrocarbon feed.

Further, as an exemplary embodiment, a control mechanism may be utilized with this configuration to determine the separation level, monitor the operational data and adjust operational settings to manage the separation level. As an example, a process control unit, which is discussed above in FIG. 2, may include a computer system coupled to one or more measurement devices and/or one or more control units within the system. As an example for this configuration, the computer system having a set of instructions to manage one or more control units, to obtain operational data from one or more measuring devices and to calculate a separation level. The calculated separation level may be based on the flow rate within the system 300, similar to the discussion above. In particular, the flow rate of the hydrocarbon feed along the line 304 may be monitored by a feed measuring device prior to the separation unit 306. The flow rate of the light fraction stream along the line 316 may be monitored by a light fraction measuring device along the line 316 prior to the pyrolysis furnace 330, while the flow rate of the heavy fraction stream may be monitored along the line 318 by a heavy fraction measuring device prior to the fuel conversion unit 320. Based on the operational data from these measuring devices, the computer system of the process control unit may calculate a separation level or access a previously determined separation level. A comparison of the operational data (e.g., flow rates for this example) and the desired separation level may be performed, which may be a difference comparison or other suitable comparison. Based on the comparison, the computer system may send signals to the one or more control units to adjust the flow valves coupled along the lines 316 or 318 to increase or decrease the flow of the light fraction stream, heavy fraction stream, and/or a combination of both.

Another example may include adjusting the temperature of the hydrocarbon feed within the separation unit 306 to adjust the separation level. In this exemplary configuration, a process control unit, which is discussed above in FIG. 2, may include a computer system coupled to one or more temperature measurement devices coupled to line 304 prior to the separation unit 306 or within the separation unit 306 and one or more valves that may control pre-heater for the hydrocarbon feed or a dilution stream mixed with the hydrocarbon feed. In this example, the hydrocarbon feed may be preheated to a higher or lower temperature to adjust the separation level, or may include having a dilution fluid, such as steam or water, added into line 304 or directly into separation unit 306 to increase or decrease the temperature of the hydrocarbon feed. By increasing the temperature of the hydrocarbon feed, the separation level may be adjusted to increase the portion of the hydrocarbon feed that is provided to the light fraction stream, while the portion of the hydrocarbon feed provided to the heavy fraction stream may be decreased. Similarly, by decreasing the temperature of the hydrocarbon feed, the separation level may be adjusted to decrease the portion of the hydrocarbon feed that is provided to the light fraction stream, while the portion of the hydrocarbon feed provided to the heavy fraction stream may be increased. Similar to the discussion above, the computer system of the process control unit may have a set of instructions stored in memory, which are configured to manage one or more control units (e.g., valves coupled to the dilution stream or pre-heater settings), to obtain operational data (e.g., temperature data) from the temperature measuring devices and to calculate a separation level. The calculated separation level may be based on the flow rate within the system 300, similar to the discussion above. The adjustments to the hydrocarbon feed temperature may vary depending on the specific temperatures involved for the hydrocarbon feed and the dilution stream, if any.

As may be appreciated, the different types of operational data may be utilized by monitoring other types of measuring devices coupled to the different units or lines. The measuring devices may monitor temperature and flow rate, as noted above and may also monitor pressure, such as partial pressure within the separation unit 306, or other suitable operational data. For example, the measuring devices may include monitoring the pressure within the separation unit 306 or along the line 304, the partial pressure of the hydrocarbon feed in the unit 306 and/or the amount of dilution fluid mixed with the streams at various points within the process prior to separation, as discussed above. Regardless of the specific operating parameters utilized, different configurations may be implemented to manage the ratio of chemical products versus electric power provided by the system.

Beneficially, this configuration provides a simplified approach to managing the production of electric power and olefins over conventional approaches. First, this configuration is a simplified arrangement that removes complexity from the process associated with dividing the stream into multiple distillate streams. By dividing the stream into a light fraction stream and a heavy fraction stream, the separation unit 306 does not involve the separation of different distillate streams and simplifies the configuration and operation of the separation unit 306 by eliminating the need for distillate sidestream processing steps. Further, as this configuration utilizes a single unit to separate the light fraction stream and the heavy fraction stream, the cost for the installation and maintenance of the system may be reduced because additional units are not utilized in the process to separate the hydrocarbon feed into multiple distillate streams. That is, the proposed configuration does not include an atmospheric distillation tower and/or a vacuum distillation tower, for example.

FIG. 4 is a block flow diagram relating to another exemplary configuration 400 for co-producing electric power along with olefins in accordance with the present techniques. Similar to the discussion of FIG. 3, the process in this diagram separates the hydrocarbon feed into a light fraction stream and a heavy fraction stream. The heavy fraction stream may be processed through a fuel conversion unit 420, which may be a boiler or partial oxidation unit, via line 418 to heat boiler water feed provided via line 421 into steam or react with oxygen provided via line 421 to produce syngas for use in turbine 422 to generate electric power provided via line 424. The light fraction stream may be processed by a pyrolysis unit 430 having a convection section 432 and a radiant section 434, a heat exchanger 436, and a vapor/liquid separation unit 438 that separates a bottoms stream into line 440 and a vapor effluent for processing in a fractionator 442. As may be appreciated, the processing of the light fraction stream and heavy fraction stream may be processed with units operating similar to the discussion of FIGS. 2 and 3. However, in this configuration 400, the separation process is modified to divide the hydrocarbon feed into a light fraction stream and heavy fraction stream in a separation unit 406 after initially being heated in the convection section 432 of the pyrolysis unit 430. That is, the separation in this configuration involves heating the hydrocarbon feed in the pyrolysis furnace prior to separating the light fraction stream and heavy fraction stream.

In this configuration 400, a hydrocarbon feed is provided via line 404 to the convection section 432 of the pyrolysis unit 430 and then to a separation unit 406. This separation unit 406 may include flash drum, or any other separation unit described previously in the discussion of separation unit 306 of FIG. 3. The temperature utilized as part of the separation may range between 260° C. and 480° C. dependent upon the desired separation level. The pressure in separation unit 406 may be utilized to adjust the separation over a range of 75 psia up to 200 psia. Again, this pressure range may include hydraulic considerations for downstream processing units and the pyrolysis furnace.

The light fraction stream may optionally be sent back into the bottom of the convection section to preheat even further before entering the radiant section. The preferred separation unit 406 and its integration with pyrolysis unit 430 are known to those skilled in the art. For instance, this integration has been described in U.S. Patent Application Publication Nos. 2004/0004022, 2004/0004027, and 2004/0004028, and more recently in U.S. application Ser. Nos. 11/068,615; 10/851, 486; 10/851,546; 10/851,878; 10/851,494; 10/851,487; 10/851,434; 10/851,495; 10/851,730; 10/851,500; 11/134, 148; 10/975,703; 10/891,795; 10/891,981; 10/893,715; 11/009,661; and 11/177,076. From the separation unit a light fraction stream is provided via line 416 to the radiant section 434 of the pyrolysis unit 430 and the heavy fraction stream is provided via line 418 to the boiler fuel conversion unit 420. Each of these streams may be processed in a manner similar to the discussions of FIGS. 2 and 3.

Similar to the discussion above, this configuration 400 may use different operating parameters in a similar manner to adjust the separation level within the separation unit 406, as discussed above for FIG. 3. In addition, this configuration may further provide additional adjustments that may be utilized. For example, in this configuration, a dilution fluid, such as steam and/or water, may be added before or after the convection section 432, but prior to the separation unit 406. Further, the heating of the hydrocarbon feed and any dilution stream, if any, may be adjusted by increasing the number of times the hydrocarbon feed is passed through the convection section 432, adjusting the dampers in the pyrolysis furnace 430 or adjusting the burner feed (e.g., temperature in the pyrolysis furnace 430). Moreover, the measuring of the temperature and flow rates may be performed prior to or after the hydrocarbon feed passes through the convection section 432, depending on the specific configuration.

Table 1 is an example of mass and energy balance based on configuration 400.

TABLE 1

| | Example Mass and Energy Balance |
|---|---|
| Crude Oil, kbd | 200 |
| Light fraction, wt % | 41 |
| Heavy Fraction, wt % | 59 |
| Products, kta | |
| Ethylene | 1200 |
| Propylene | 644 |
| Butylenes | 372 |
| Power from Steam Turbine (GW) | 2.6 |

In this example, a whole crude oil (e.g., the hydrocarbon feed) is fed to the convection section 432 of the pyrolysis furnace 430, mixed with steam as described above to form a hydrocarbon mixture and heated to a temperature of 330° C. The hydrocarbon mixture is then fed to separation unit 406 at a pressure of 125 psia, which divides the hydrocarbon mixture into a light fraction stream and a heavy fraction stream. The light fraction stream produced represents 41 wt % of the crude oil feed with a final boiling point of 343° C. and the heavy fraction stream produced represents the remaining 59 wt % of the crude oil feed. The light fraction stream is then processed through the radiant section 434, where it exits as effluent rich in olefins at a temperature of 860° C. The primary olefin products may include ethylene, propylene, and/or butylenes in the amounts of 1200 thousand metric tons per year, 64 thousand metric tons per year, and 372 thousand metric tons per year, respectively, for example. The heavy fraction stream is processed in the fuel conversion unit 420, which may be a fired steam-producing boiler in fluid communication with a turbine to produce 2.6 gigawatts of electric power.

Beneficially, this configuration provides separation that may be managed by controlling the temperature of the separation of the light fraction stream and the heavy fraction stream. If the separation unit is in fluid communication with a control system or control mechanism, the operating parameters and thus split fraction may be manipulated to optimize the olefin yield and reduce the production of tar and other undesired products, while also optimizing the feed to the power generation apparatus.

In addition, in some embodiments, a desalination unit may also be utilized to use the steam produced from the boilers and used in the turbine or use the excess steam produced from recovering waste heat in the partial oxidation unit to evaporate salt water. The purified water, new devoid of excess salt, can then be condensed and used as cooling or process water which is necessary to prevent excess scaling and fouling in vessels and heat exchangers or can be sold into municipal water supplies if the need exists.

Further, certain embodiments of the present techniques may include mixing the hydrocarbon feed with a fluid, which may be a hydrocarbon, preferably liquid, but optionally vapor, water, steam, or a mixture thereof. A source of the fluid can be low pressure boiler feed water. The temperature of the fluid can be below, equal to, or above the temperature of the hydrocarbon feed, which may depend on the specific configuration. As an example, U.S. Patent App. Pub. No. 2005/0209495 discloses an exemplary system for mixing a fluid with the hydrocarbon feed, which uses mixing devices, such as one or more spargers, one or more double sparger assemblies, or the like.

To manage the separation level, various mechanisms may be utilized in one or more of the embodiments. For instance, a dilution stream may have a temperature greater than, lower than, or about the same as hydrocarbon feed to control the temperature of the hydrocarbon feed prior to separation. The dilution stream may be mixed with the hydrocarbon feed as it is initially heated, after passing through the convection section, and/or before the separation unit. The dilution steam may be superheated to minimize the risk of corrosion. Further, the dilution stream temperature may be managed by providing different dilution fluids to a dilution valve unit that is designed to mix the different temperature streams in a manner to manage the resulting temperature of the dilution stream to be mixed with the hydrocarbon feed. To provide the dilution fluids of different temperatures, the dilution fluid may be heated from the boiler, heated in the convection section of the pyrolysis unit, or may be heated in a heat exchanger, as an example. Another advantage of dilution fluids can be lowering the partial pressure of the hydrocarbon feed to increase the recovery of the light fraction stream, if that operation is desired and optimal. Lowering the dilution ratio can affect more of the feed being separated into the heavy fraction to increase the power production capability if that operation is desired and optimal.

Further, it should be appreciated that the process control unit may include a computer system, one or more measuring devices and/or one or more control units that operate in real time, concurrently with the processing of the hydrocarbon, prior or during the processing of the hydrocarbon feed, or a combination thereof. Real time refers to the ability to observe operational data during the operation being performed, at or near in time with the actual operation being performed. Concurrently refers to data flow that has been delayed in some way, such as to allow a calculation of results or polling to provide the data within a specific time window.

In many embodiments, the hydrocarbon feed is fed to a steam cracking furnace, which is an example of the pyrolysis furnace. Typically, such furnaces include a convection section for convection heating the hydrocarbon feed within one or more tube banks, and a radiant section for pyrolysis cracking or radiant heating and cracking of the effluent within a radiant tube bank. Such furnaces are well known within the cracking industry. Preferably, the steam cracking furnace is a liquid feed cracker, although in some alternative embodiments the cracker may be a gas cracker such as used to crack an ethane feed that is modified or otherwise adjusted for cracking a liquid feed.

The flashing in either the first separation unit (e.g., drum) may be conducted in any convenient fashion or apparatus to provide the flash liquids and vapors. One useful method may be derived from U.S. Pat. No. 7,138,047 wherein the flashing is conducted along with the addition of water and heat to the feed in an integrated pyrolysis unit apparatus, incorporated herein by reference. The temperature within the flash drums, and hence the flash liquids and vapors, may be the same ranges as the temperature of the mixes described above, or the same ranges described above less about 1° C. (1° F.). The pressure within the flash drums and hence the flash liquids and vapors, may be the same ranges as the mixes described above, the same ranges described above less about 7 kPa (1 psia).

Further, the process and system may include other embodiments, which are described below:

1. A process for co-production of olefins and electric power comprising:
determining a separation level of a hydrocarbon feed based on olefin production requirements and electric power requirements;
separating a hydrocarbon feed into a light fraction stream and a heavy fraction stream based on the determined separation level;
generating electric power from at least a portion of the heavy fraction stream; and
cracking at least a portion of the light fraction stream in a pyrolysis unit to produce an effluent comprising olefins.

2. The process of paragraph 1, wherein the at least a portion of the heavy fraction stream is between 35 wt % and 80 wt % of the hydrocarbon feed.

3. The process of paragraph 2, wherein the at least a portion of the light fraction stream is between 20 wt % and the remaining portion of the hydrocarbon feed.

4. The process of paragraph 1, wherein the at least a portion of the heavy fraction stream is between 45 wt % and 70 wt % of the hydrocarbon feed.

5. The process of paragraph 5, wherein the at least a portion of the light fraction stream is between 30 wt % and the remaining portion of the hydrocarbon feed.

6. The process of any one of paragraphs 1 to 5, wherein the at least a portion of the light fraction stream comprises one or more atmospheric distillate streams and the at least a portion of the heavy fraction stream comprises atmospheric bottom stream and one or more of the remaining atmospheric distillate streams.

7. The process of any one of paragraphs 1 to 5, wherein the at least a portion of the light fraction stream comprises one or more atmospheric distillate streams and one or more vacuum distillate streams and the at least a portion of the heavy fraction stream comprises a vacuum residuum stream and one or more of the remaining atmospheric or vacuum distillate streams.

8. The process of any one of paragraphs 1 to 7 comprising heating the hydrocarbon feed in a convection section of a pyrolysis unit prior to separating the hydrocarbon feed.

9. The process of any one of paragraphs 1 to 8, wherein the separating a hydrocarbon feed into the light fraction stream and the heavy fraction stream consists of separating the hydrocarbon feed into one light fraction stream and one heavy fraction stream.

10. The process of any one of paragraphs 1 to 8, wherein the light fraction stream comprises two or more light fraction streams.

11. The process of any one of paragraphs 1 to 10, wherein the determining the separation level is based upon the temperature of the hydrocarbon feed.

12. The process of paragraph 11, comprising adjusting an amount of a fluid mixed with the hydrocarbon feed prior to the separating the hydrocarbon feed based on the determined separation level and the temperature of the hydrocarbon feed.

13. The process of any one of paragraphs 1 to 10, wherein the determining the separation level is based upon a flow rate of the hydrocarbon feed prior to the separating the hydrocarbon feed and/or a flow rate of the at least a portion of the light fraction stream prior to the cracking the at least a portion of the light fraction stream.

14. The process of paragraph 13, comprising adjusting the flow rate of the at least a portion of the light fraction stream based on the determined separation level, the flow rate of the hydrocarbon feed, and the flow rate of the at least a portion of the light fraction stream.

15. The process of any one of paragraphs 1 to 14, wherein the generating electric power from at least a portion of the heavy fraction stream comprises:
receiving water in a boiler;
heating the water by burning the at least a portion of the heavy fraction stream in the boiler;
passing the steam to a turbine; and
generating electric power from the steam in the turbine.

16. The process of any one of paragraphs 1 to 14, wherein the generating electric power from at least a portion of the heavy fraction stream comprises:
receiving an oxidant in a partial oxidation unit;
reacting the oxidant and the at least a portion of the heavy fraction stream to produce a gas rich in hydrogen and carbon monoxide;
passing at least a portion of the gas rich in hydrogen and carbon monoxide to a turbine; and
generating electric power from at least a portion of the gas rich in hydrogen and carbon monoxide in the turbine.

17. A hydrocarbon processing system comprising:
a separation unit configured to:
divide a hydrocarbon feed into light fraction stream and heavy fraction stream;
a process control unit having one or more control units and configured to adjust the separation level in the separation unit based on olefin production requirements and electric power requirements;
a pyrolysis unit in fluid communication with the separation unit, wherein the pyrolysis unit is configured to create an effluent from a portion of the light fraction stream; and
a fuel conversion unit in fluid communication with the separation unit and configured to convert a portion of the heavy fraction stream into a turbine feed; and
a turbine in fluid communication with the fuel conversion unit and configured to generate electric power with the at least a portion of the turbine feed.

18. The system of paragraph 17, wherein a convection section of the pyrolysis unit is configured to heat the hydrocarbon feed prior to the separation unit dividing the hydrocarbon feed into the light stream and the heavy stream.

19. The system of any one of paragraphs 17 to 18, wherein the separation unit is configured to divide the hydrocarbon feed into one light fraction stream and one heavy fraction stream.

20. The system of any one of paragraphs 17 to 18, wherein the light fraction stream comprises two or more light fraction streams.

21. The system of any one of paragraphs 17 to 20, wherein the process control unit comprises:
a temperature measurement device configured to measure the temperature of the hydrocarbon feed prior to the separation unit; and
wherein the one or more control units comprise a dilution control unit configured to adjust the amount of a fluid mixed with the hydrocarbon feed prior to the separation unit.

22. The system of paragraph 21, wherein the process control unit comprises a computer system having a set of instructions to:
calculate the amount of the fluid to be mixed with the hydrocarbon feed based on the separation level and the measured temperature; and
communicate the adjustment to the dilution control unit.

23. The system of any one of paragraphs 17 to 20, wherein the process control unit comprises:
a hydrocarbon feed measurement device configured to measure flow rate of the hydrocarbon feed prior to the separation unit;
a light fraction measurement device configured to measure flow rate of the at least a portion of the light fraction stream prior to the pyrolysis unit; and
wherein the one or more control units comprise a light fraction control unit configured to adjust the flow rate of the at least a portion of the light fraction stream based on the determined separation level, the measured flow rate of the hydrocarbon feed, and the measured flow rate of the at least a portion of the light fraction stream.

24. The system of paragraph 23, wherein the process control unit comprises a computer system having a set of instructions to:
calculate the amount of adjustment to the flow rate of the at least a portion of the light fraction stream based on the determined separation level, the measured flow rate of the hydrocarbon feed, and the measured flow rate of the at least a portion of the light fraction stream; and
communicate the adjustment to the light fraction control unit.

25. The system of any one of paragraphs 17 to 24, wherein the fuel conversion unit is a boiler configured to:
receive water;
heat the water by burning the at least a portion of the heavy fraction stream to generate the turbine feed being steam; and
pass the steam to the turbine.

26. The system of any one of paragraphs 17 to 24, wherein the fuel conversion unit is a partial oxidation unit and is configured to:
receive an oxidant;
react the oxidant and the at least a portion of the heavy fraction stream to produce the turbine feed being a gas rich in hydrogen and carbon monoxide; and
pass at least a portion of the gas rich in hydrogen and carbon monoxide to the turbine.

27. The system of any one of paragraphs 17 to 26, wherein the pyrolysis unit comprising a convection section and a radiant section, and the separation unit is coupled between the convection section and the radiant section and is configured to provide the portion of the light fraction stream to the radiant section to create the effluent.

28. The system of any one of paragraphs 17 to 27, wherein the separation unit is a flash drum that divides the hydrocarbon feed into the light fraction stream and the heavy fraction stream, wherein the light fraction stream is a single light fraction stream and heavy fraction stream is a single heavy fraction stream.

29. The system of any one of paragraphs 17 to 26, comprising:
an atmospheric distillation unit in fluid communication with the separation unit and configured to:
receive a feed;
separate the feed into an atmospheric bottoms stream and the hydrocarbon feed being one or more atmospheric distillate streams; and
pass the hydrocarbon feed to the separation unit, wherein the separation unit comprises one or more valves in fluid communication with each other and one of the one or more valves being associated with one of one or more atmospheric distillate streams, the separation unit configured direct each one of the one or more atmospheric distillate streams into one of the heavy fraction stream or the light fraction stream.

30. The system of paragraph 17, comprising:
an atmospheric distillation unit in fluid communication with the separation unit and configured to:
receive a feed;
separate the feed into an atmospheric bottoms stream and the hydrocarbon feed being one or more atmospheric distillate streams;
pass the hydrocarbon feed to the separation unit,
a vacuum distillation unit in fluid communication with the separation unit and the atmospheric distillation unit and configured to:
receive the atmospheric bottoms stream;
separate the atmospheric bottoms stream into a vacuum bottoms stream and the one or more vacuum distillate streams; and
pass the one or more vacuum distillate streams to the separation unit,
wherein the separation unit comprises one or more valves in fluid communication with each other and one of the one or more valves being associated with one of one or more atmospheric distillate streams and the one of one or more vacuum distillate streams, the one of one or more atmospheric distillate streams and the one of one or more vacuum distillate streams forming the hydrocarbon feed, and the separation unit configured to direct each one of the one or more atmospheric distillate streams and the one or more vacuum distillate streams into one of the heavy fraction stream or the light fraction stream.

31. A process for co-production of olefins and electric power comprising:
separating a hydrocarbon feed into a light fraction stream and a heavy fraction stream;
generating electric power from at least a portion of the heavy fraction stream, wherein the at least a portion of the at least heavy fraction stream comprises between 35 wt % to 80 wt % of the hydrocarbon feed; and
cracking at least a portion of the light fraction stream in a cracking reactor to produce an effluent comprising olefins, wherein the light fraction stream comprises between 20 wt % to the remaining portion of the hydrocarbon feed.

32. The process of paragraph 31, determining a separation level based on olefin production requirements and electric power requirements.

33. The process of any one of paragraphs 31 to 32, wherein the at least a portion of the heavy fraction stream is between 45 wt % and 70 wt % of the hydrocarbon feed and the at least a portion of the light fraction stream is between 30 wt % and the remaining portion of the hydrocarbon feed.

34. The process of any one of paragraphs 31 to 33, wherein the at least a portion of the light fraction stream comprises one or more atmospheric distillate streams and the at least a portion of the heavy fraction stream comprises atmospheric bottom stream and one or more of the remaining atmospheric distillate streams.

35. The process of any one of paragraphs 31 to 33, wherein the at least a portion of the light fraction stream comprises one or more atmospheric distillate streams and one or more vacuum distillate streams and the at least a portion of the heavy fraction stream comprises a vacuum residuum stream and one or more of the remaining atmospheric distillate streams.

36. The process of any one of paragraphs 31 to 35 comprising heating the hydrocarbon feed in a convection section of a pyrolysis unit prior to separating the hydrocarbon feed.

37. The process of any one of paragraphs 31 to 36, wherein the separating a hydrocarbon feed into the light fraction stream and the heavy fraction stream consists of separating the hydrocarbon feed into one light fraction stream and one heavy fraction stream.

38. The process of any one of paragraphs 31 to 36, wherein the light fraction stream comprises two or more light fraction streams.

39. The process of any one of paragraphs 31 to 38, comprising:
measuring the temperature of the hydrocarbon feed prior to separating the hydrocarbon feed;
and adjusting the amount of a fluid mixed with the hydrocarbon feed prior to the separating the hydrocarbon feed based on a determined separation level and the measured temperature.

40. The process of any one of paragraphs 31 to 39, comprising:
measuring flow rate of the hydrocarbon feed prior to the separating the hydrocarbon feed;
measuring flow rate of the at least a portion of the light fraction stream prior to the cracking the at least a portion of the light fraction stream; and
adjusting the flow rate of the at least a portion of the light fraction stream based on a determined separation level, the measured flow rate of the hydrocarbon feed, and the measured flow rate of the at least a portion of the light fraction stream.

41. The process of any one of paragraphs 31 to 40, wherein the generating electric power from at least a portion of the heavy fraction stream comprises:
receiving water in a boiler;
heating the water by burning the at least a portion of the heavy fraction stream in the boiler;
passing the steam to a turbine; and
generating electric power from the steam in the turbine.

42. The process of any one of paragraphs 31 to 40, wherein the generating electric power from at least a portion of the heavy fraction stream comprises:
receiving an oxidant in a partial oxidation unit;
reacting the oxidant and the at least a portion of the heavy fraction stream to produce a gas rich in hydrogen and carbon monoxide;
passing at least a portion of the gas rich in hydrogen and carbon monoxide to a turbine; and
generating electric power from at least a portion of the gas rich in hydrogen and carbon monoxide in the turbine.

The foregoing application is directed to particular embodiments of the present techniques for the purpose of illustrating it. It will be apparent, however, to one skilled in the art, that many modifications and variations to the embodiments described herein are possible. Further, some embodiments may be preferably performed at least partly on a computer, i.e., computer-implemented embodiments of the present inventive method are preferred, but not essential. All such modifications and variations are intended to be within the scope of the present invention, as defined in the appended claims.

What is claimed is:

1. A hydrocarbon processing system comprising:
a separation unit configured to divide a hydrocarbon feed into a light fraction stream and a heavy fraction stream;
a process control unit having one or more control units and configured to adjust a separation level in the separation unit based on olefin production requirements and electric power requirements;
a pyrolysis unit in fluid communication with the separation unit, wherein the pyrolysis unit is configured to create an olefin effluent from a portion of the light fraction stream; and
a fuel conversion unit in fluid communication with the separation unit and configured to convert a portion of the heavy fraction stream into a turbine feed; and
a turbine in fluid communication with the fuel conversion unit and configured to generate electric power with at least a portion of the turbine feed.

2. The system of claim 1, wherein a convection section of the pyrolysis unit is configured to heat the hydrocarbon feed prior to the separation unit dividing the hydrocarbon feed into the light stream and the heavy stream.

3. The system of claim 1, wherein the separation unit is configured to divide the hydrocarbon feed into one light fraction stream and one heavy fraction stream.

4. The system of claim 1, wherein the light fraction stream comprises two or more light fraction streams.

5. The system of claim 1, wherein the process control unit comprises:
a temperature measurement device configured to measure the temperature of the hydrocarbon feed prior to the separation unit; and
wherein the one or more control units comprise a dilution control unit configured to adjust the amount of a fluid mixed with the hydrocarbon feed prior to the separation unit.

6. The system of claim 5, wherein the process control unit comprises a computer system having a set of instructions to:
calculate the amount of the fluid to be mixed with the hydrocarbon feed based on the separation level and the measured temperature; and
communicate the amount to the dilution control unit.

7. The system of claim 1, wherein the process control unit comprises:
a hydrocarbon feed measurement device configured to measure flow rate of the hydrocarbon feed prior to the separation unit;
a light fraction measurement device configured to measure flow rate of the at least a portion of the light fraction stream prior to the pyrolysis unit; and
wherein the one or more control units comprise a light fraction control unit configured to adjust the flow rate of the at least a portion of the light fraction stream based on the separation level, the measured flow rate of the hydrocarbon feed, and the measured flow rate of the at least a portion of the light fraction stream.

8. The system of claim 7, wherein the process control unit comprises a computer system having a set of instructions to:
calculate the amount of adjustment to the flow rate of the at least a portion of the light fraction stream based on the determined separation level, the measured flow rate of the hydrocarbon feed, and the measured flow rate of the at least a portion of the light fraction stream; and
communicate the adjustment to the light fraction control unit.

9. The system of claim 1, wherein the fuel conversion unit is a boiler configured to:
receive water;
heat the water by burning the at least a portion of the heavy fraction stream to generate the turbine feed being steam; and
pass the steam to the turbine.

10. The system of claim 1, wherein the fuel conversion unit is a partial oxidation unit and is configured to:
receive an oxidant;
react the oxidant and the at least a portion of the heavy fraction stream to produce the turbine feed being a gas rich in hydrogen and carbon monoxide; and
pass at least a portion of the gas rich in hydrogen and carbon monoxide to the turbine.

11. The system of claim 1, wherein the pyrolysis unit comprising a convection section and a radiant section, and the separation unit is coupled between the convection section and the radiant section and is configured to provide the portion of the light fraction stream to the radiant section to create the effluent.

12. The system of claim 1, wherein the separation unit is a flash drum that divides the hydrocarbon feed into the light fraction stream and the heavy fraction stream, wherein the light fraction stream is a single light fraction stream and heavy fraction stream is a single heavy fraction stream.

13. The system of claim 1, comprising:
an atmospheric distillation unit in fluid communication with the separation unit and configured to:
receive a feed;
separate the feed into an atmospheric bottoms stream and the hydrocarbon feed being one or more atmospheric distillate streams; and
pass the hydrocarbon feed to the separation unit, wherein the separation unit comprises one or more valves in fluid communication with each other and one of the one or more valves being associated with one of one or more atmospheric distillate streams, the separation unit configured direct each one of the one or more atmospheric distillate streams into one of the heavy fraction stream or the light fraction stream.

14. The system of claim 1, comprising:
an atmospheric distillation unit in fluid communication with the separation unit and configured to:
receive a feed;
separate the feed into an atmospheric bottoms stream and the hydrocarbon feed being one or more atmospheric distillate streams;
pass the hydrocarbon feed to the separation unit,
a vacuum distillation unit in fluid communication with the separation unit and the atmospheric distillation unit and configured to:
receive the atmospheric bottoms stream;
separate the atmospheric bottoms stream into a vacuum bottoms stream and one or more vacuum distillate streams; and
pass the one or more vacuum distillate streams to the separation unit, wherein the separation unit comprises one or more valves being associated with one of one or more atmospheric distillate streams and one of one or more vacuum distillate streams, the one of one or more atmospheric distillate streams and the one of one or more vacuum distillate streams forming the hydrocarbon feed, and the separation unit configured to direct each one of the one or more atmospheric distillate streams and the one or more vacuum distillate streams into one of the heavy fraction stream or the light fraction stream.

* * * * *